(No Model.) 2 Sheets—Sheet 1.

W. O. BEMENT.
DIE FOR ROLLING SCREW THREADS.

No. 510,109. Patented Dec. 5, 1893.

Witnesses
Lawrence C. Greenman
Frederick E. Fuller

Inventor
William O. Bement (No Model.) 2 Sheets—Sheet 2.

W. O. BEMENT.
DIE FOR ROLLING SCREW THREADS.

No. 510,109. Patented Dec. 5, 1893.

Witnesses.
Lawrence P. Greenman
Frederick E. Fuller

Inventor,
William O. Bement

UNITED STATES PATENT OFFICE.

WILLIAM O. BEMENT, OF WORCESTER, MASSACHUSETTS, ASSIGNOR TO THE WIRE GOODS COMPANY, OF SAME PLACE.

DIE FOR ROLLING SCREW-THREADS.

SPECIFICATION forming part of Letters Patent No. 510,109, dated December 5, 1893.

Application filed May 8, 1893. Serial No. 473,429. (No model.)

*To all whom it may concern:*

Be it known that I, WILLIAM O. BEMENT, a citizen of the United States, residing at Worcester, in the county of Worcester and Commonwealth of Massachusetts, have invented certain new and useful Improvements in Dies for Rolling Screw-Threads, of which the following is a specification.

My invention relates to dies for forming screw threads by rolling the blanks to be threaded between dies, which can be adapted to produce either a straight or a gimlet-pointed thread, as may be desired.

Figure 5:
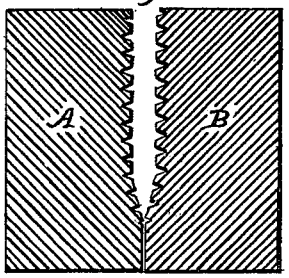
Figure 4:
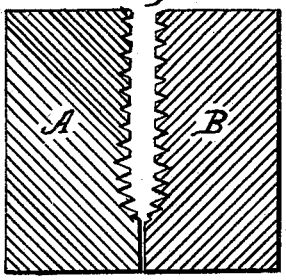
Figure 3:
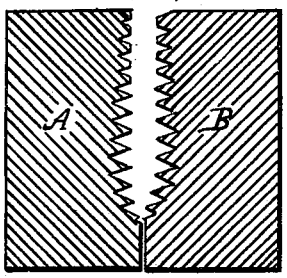
Figure 2:
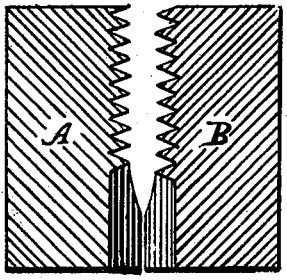
Figure 1:
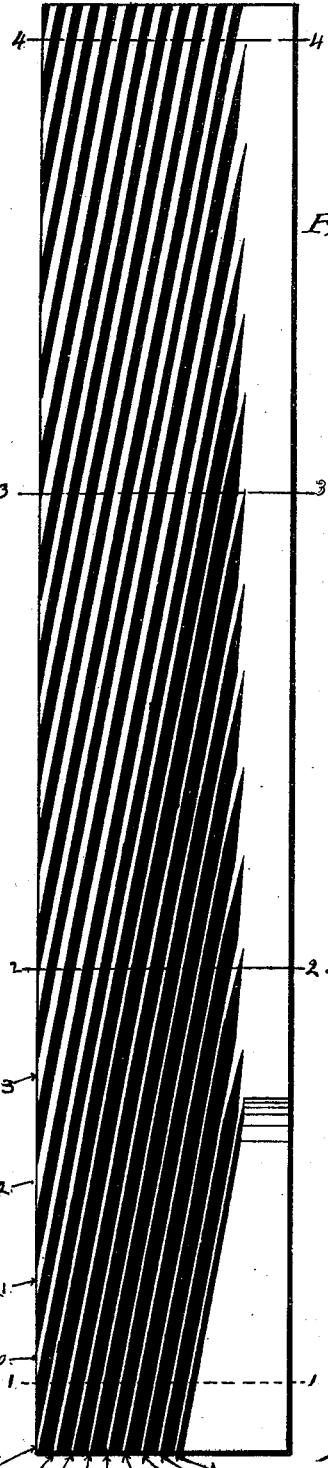
Figure 9:
Figure 8:
Figure 7:
Figure 6:
Figure 10:
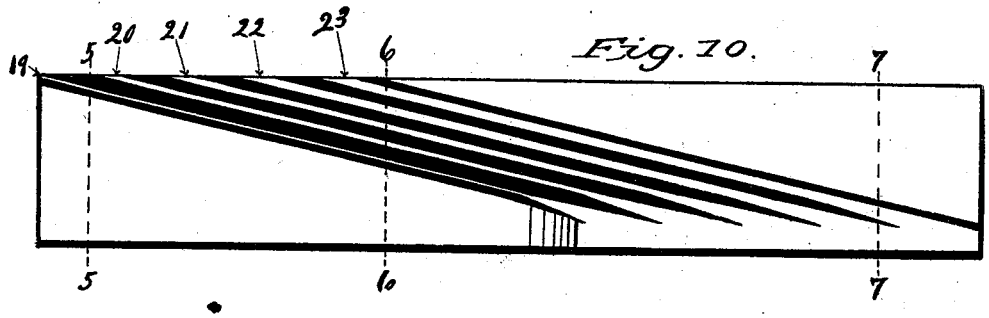
Figure 11:
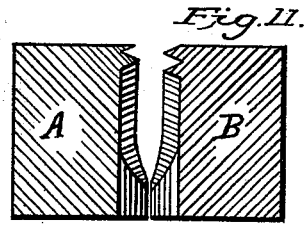
Figure 12:
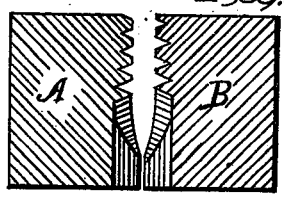
Figure 13:
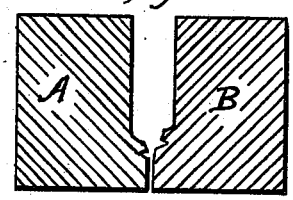
Figure 14:
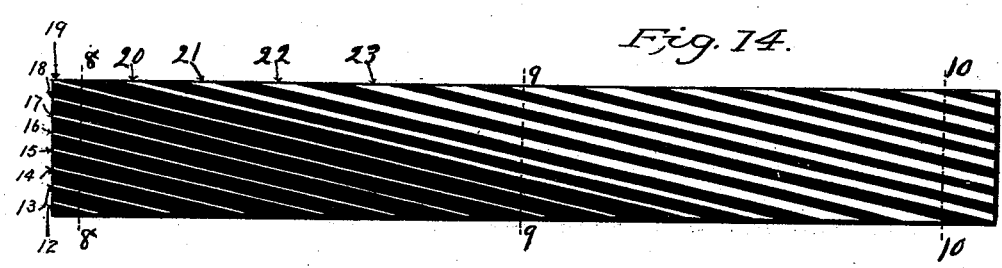
Figure 15:
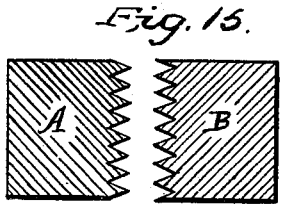
Figure 16:
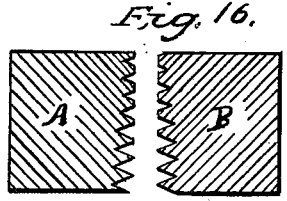
Figure 17:
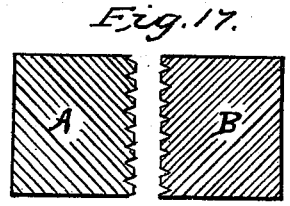

In the drawings, Figure 1 represents one of my improved dies showing a plan view of the working face of the die, which is curved at its lower side, being designed to roll a gimlet-pointed thread, and hence, conforms to the shape of the blank. The heavy lines indicate the spaces between the ribs, and the unshaded lines indicate the ribs which form the thread. The entering end of the die is at the bottom of the sheet. Fig. 2 is a sectional view of two dies, through the line 1—1, Fig. 1. Fig. 3 is a sectional view through the line 2, 2, Fig. 1. Fig. 4 is a sectional view through the line 3, 3, Fig. 1. Fig. 5 is a sectional view through the lines 4, 4, Fig. 1. Fig. 6 represents the blank at the point of action, of the dies, shown in Fig. 2, and similarly. Figs. 7, 8 and 9 represent the blank at the points of action of the dies shown in Figs. 3, 4 and 5, in which will be noticed a gradual development of the thread from the root to the point. The shape of the dies in cross section, and the progressive development of the thread at four several stages of the operation are thus clearly illustrated. Fig. 10 is also a plan of the working face of one die showing a smaller number of ribs with which the threading may be done. The entering end of the die is at the left of the sheet. Figs. 11, 12, and 13, show the dies in cross section at the three points 5, 5, 6, 6, 7, 7, Fig. 10. Fig. 14 is a plan view of a die with a flat face, designed to thread a blank with a straight surface, the entering end of the die being at the left of the sheet. Figs. 15, 16 and 17, are sectional views of this die, and its mate at the points 8, 8, 9, 9, 10, 10.

The faces of the dies shown in Figs. 1 and 10, are necessarily curved along their lower sides as they are designed to produce gimlet-pointed screws, as illustrated in the several sectional views of the dies shown in connection with those figures.

Upon turning to Figs. 1, 10, and 14, it will be noticed that each of the ribs, or raised portions of the die, which run across its face, and which are designated by the unshaded portions, 11, 12, 13, &c., is substantially of the same width from end to end. It will be noticed that all the ribs which start from the entering end of the die, are so cut that their tops are sharp. This is shown in Fig. 2, and in the corresponding Figs. 11 and 15, in connection with the other face views of the dies, Figs. 10 and 14. The effect upon the blank is clearly shown in Fig. 6, where the body of the blank is sharply scored, but at this stage, the point of the blank is not threaded. As soon as the ribs begin to run from the side of the die, 19, 20, 21, 22, 23, &c., they increase somewhat in width, each being a little broader than the preceding one, until the ribs are wide enough to produce the desired thread, when the width becomes uniform. This is shown in the sectional views in Figs. 3, 4 and 5, and the progressive formation of the thread is illustrated at corresponding points in the process in Figs. 7, 8 and 9, the distinguishing feature of my form of die being that the thread is gradually developed from the root to the point, of the blank, every working rib essential to the process beginning at the base of the thread and acting throughout its entire length.

It will be noticed that in Fig. 7, the thread is already perfect at the top, while still only partially developed at the lower portion.

In Fig. 8, there is a still further progress as the wide ribs act upon the lower parts of the screw, while in Fig. 9, the thread is completed throughout its entire length.

While I prefer to have several sharp cutting ribs at the entering end of the die, in order that the body of the blank may at the outset, be scored throughout the length of the thread as shown in Figs. 1, and 2, and in the view of the blank shown in Fig. 6, this is not essential to the successful operation of my improved dies, for I can dispense with all but one of the sharp ribs and only need to use a succession of ribs of increasing width sufficient to secure the full development of the thread. This is illustrated in Fig. 10, which shows the working face of one die, in plan, with one sharp rib 19, and four ribs of increasing widths, 20, 21, 22, 23. The progressive operation of the dies is shown in Figs. 11, 12, and 13.

Fig. 11, a sectional view through the line 5, 5, shows the sharp rib 19, and its corresponding rib in the felly die, in position to begin to score the blank, throughout its length, beginning at the top.

Fig. 12, a sectional view through the line 6, 6, shows the position of all the working ribs as they act upon the body of the blank, when the operation of threading is partially completed, the upper threads only being perfect at this stage.

Fig. 13, a sectional view through the line 7, 7, shows the position of the working ribs of the dies, acting upon the point of the blank after the body of the blank is threaded, and has passed beyond the action of the working ribs.

The action of my dies may be compared to the action of a series of chasing tools upon a blank, cutting threads in the old fashioned way, each tool cutting a little deeper than the preceding one, the thread being developed from the root of the blank toward the point. Of course, the chasing tools cut away the stock, while my dies act upon it by forcing the metal, by compression, into the V-shaped spaces between the ribs, in the old and well-known manner in which dies for roll threading act, although my method of applying the principle is different, so far as I am aware, from any which has preceded it.

In practice, I prefer to use a larger number of sharp scoring ribs, so that the entire body of the blank may be scored at the beginning of the operation, as shown in Figs. 1, 2 and 6; besides which, this arrangement of the dies affords a better support to the blank; but the principle upon which my dies work, is fully illustrated in Fig. 10, which shows as many working ribs as are necessary for its successful application, and will roll as perfect a thread as the die shown in Fig. 1.

If these dies are to be used for rolling a gimlet-pointed thread, they are made to conform to the shape of the blank, having raised portions along their lower edges, illustrated in section by Figs. 2, 3, 4 and 5; the ribs of the die extending sufficiently upon the raised portion to cut a thread upon the point of the blank.

It will be noticed in Fig. 1, that two or three of the ribs are cut away at the lower side of the entering end of the die, so that the curved portion of the blank is not acted upon by the threading ribs until the blank has advanced somewhat in the process of being threaded. This is also shown in Fig. 2, where, it will be noticed there are no working ribs to act upon the point of the blank, and in Fig. 6, where the point of the blank is still unthreaded. But, at the line 2, 2, Fig. 1, the entire body of the blank throughout the length of the thread, and also the point, are being acted upon as shown in Figs. 3 and 7.

If I simply desire to cut a thread on a straight surface, I make the die with a flat face, as shown in plan, in Fig. 14, and in section, in Figs. 15, 16, and 17.

In the drawings, it appears in the sectional figures, that the ribs which are cut sharp on the top, are cut deeper into the metal than those which are flat on top. This I find of convenience in making the dies, as it removes any necessity for changing the cutters, but I can accomplish the same result by using, to form the sharp ribs, cutters whose working faces are on a greater angle than the faces of the cutters used in forming the ribs with flat tops, thus cutting the metal at a uniform depth, for all the teeth.

The operation of my improved dies may be briefly described as follows: The dies are suitably mounted with their working faces opposite each other, and their ends reversed, so that, at the beginning of the operation, the sharp ribs in both dies may act upon the blank at the same time. A reciprocating motion is then imparted to one or both of the dies, so that their working faces move by each other backward and forward at the required speed. The blank to be threaded is placed in a vertical position against the entering end of one of the dies. As the dies pass each other, the blank is rolled along the length of the dies, first being scored by the sharp ribs, while the series of ribs of increasing width following, sufficiently compress the metal between them into the grooves of the die to form the finished thread.

For convenience in illustration, I have shown the ribs and grooves in my die running diagonally across its face, but it will be apparent that my method of threading, which develops the thread from the root to the point, by the successive action of ribs of different width, would permit me to make the ribs and grooves parallel with the main axis of my die, and I therefore do not limit myself to a die with ribs running diagonally across its face. Of course, in operating dies so cut, it will be necessary to arrange the working edges on an angle with the main axis of the blank, in order to produce a thread of the required pitch. Nor, do I limit myself to a die with the ribs and grooves cut on a flat surface, as a die with a curved surface can be made, on this principle, to work successfully, or to any particular number of ribs and grooves.

I am aware that dies for rolling threads have been made heretofore, in various ways, and I do not claim to have invented such, broadly.

What I do claim, and desire to secure by Letters Patent, is—

1. A die for rolling threads upon a blank, having a series of ribs running across its face, each working rib being wider than the preceding working rib, and each rib being of the same cross-section throughout its working length.

2. A die for rolling threads upon a blank, having a series of ribs running across its face, each rib being of the same cross-section throughout its working length; the first rib of the series having a sharp edge and each of the remaining ribs being wider than the preceding one, whereby a screw thread may be rolled upon a blank by the action of the ribs.

3. A die for rolling threads upon a blank, having a series of ribs running across its face, each of which is of the same cross-section throughout its working length, one or more of the ribs having a sharp edge and two or more of the remaining ribs of the series increasing in width, each being wider than the preceding rib, whereby a screw thread may be rolled upon a blank by the action of the ribs.

4. A die for rolling threads upon a blank, having a series of ribs, each of which is of the same cross-section throughout its working length, the faces of all the ribs which start from the entering end of the die, being of the same width, and the faces of the ribs which start from the side of the die increasing in width, each being wider than the preceding rib, until the required width is attained, when the remaining ribs are all of the same width, whereby a screw thread may be rolled upon a blank by the action of the ribs.

WILLIAM O. BEMENT.

Witnesses:
C. G. WASHBURN,
R. M. WASHBURN.